United States Patent Office 3,641,215
Patented Feb. 8, 1972

3,641,215
CO-CURABLE COMPOSITION USING PEROXIDES AND MALEIMIDES AS CROSSLINKING AGENTS
Teruyoshi Usamoto, Higashiosaka, and Taisuke Okita, Toyonaka, Japan, assignors to Sumitomo Chemical Company, Limited, Osaka, Japan
No Drawing. Filed Apr. 21, 1969, Ser. No. 818,153
Int. Cl. C08f 29/12
U.S. Cl. 260—897 A
18 Claims

ABSTRACT OF THE DISCLOSURE

A co-curable composition is provided having excellent tensile strength, oil resistance, heat resistance, etc. comprising
(A) an ethylene-propylene copolymer or ethylene-propylene-unconjugated diene terpolymer;
(B) a propylene polymer and
(C) a crosslinking agent comprising an organic peroxide and a maleimide compound.

---

The present invention relates to a co-curable novel rubber composition of either ethylene-propylene copolymer or ethylene-propylene-unconjugated diene terpolymer (which is referred to as ethylene-propylene terpolymer hereinafter) and propylene polymer.

The uses of such rubber compositions are limited because ethylene-propylene copolymers and ethylene-propylene terpolymers are superior in anti-ozonance, heat resistance, weathering-resistance etc. but are inferior in processability, chemical resistance, oil-resistance etc. If polypropylene is blended with either ethylene-propylene copolymer or ethylene-propylene terpolymer, the above disadvantages in ethylene-propylene copolymer or terpolymer are reduced. However, the physical properties of the copolymer or terpolymer in itself are lowered.

On the other hand, as polypropylene cannot be cured by a sulfur-vulcanizing system, it is necessary to use an organic peroxide vulcanizing system when co-curing a blend of polypropylene with either ethylene-propylene copolymer or ethylene-propylene terpolymer. If this blend is cured by a common organic peroxide alone, degradation of the polypropylene predominates over the cross linking reaction, and scission of the molecular chain takes place so that only a low molecular weight substance is obtained. Accordingly, in order to overcome the degradation reaction and to advance the cross-linking reaction, it is required to add to the blend a cross linking agent with a very high speed of the cross-linking. Various kinds of cross-linking agents are proposed in the specifications of British Patent 837,525, Italian Pat. 600,723, U.S. Patents 3,012,016 and 3,012,020. However, the speed of the cross-linking is not sufficient yet even if these cross-linking agents are used.

The present invention provides a co-curable composition containing (A) an ethylene-propylene copolymer or an ethylene - propylene - unconjugated diene terpolymer, (B) a propylene polymer and (C) a cross-linking agent comprising an organic peroxide and a maleimide compound.

The ethylene-propylene copolymer and ethylene-propylene terpolymer used in the present invention are prepared by the copolymerization of ethylene and propylene and by the terpolymerization of ethylene, propylene and unconjugated diene with the use of a well-known catalyst, preferably of a Ziegler-Natta type, according to the well-known method. The ethylene-propylene copolymer is a rubbery copolymer of from 50 to 80 mole-percent of ethylene content. The ethylene-propylene terpolymer is a rubbery copolymer containing from 49.5 to 80 mole-percent of ethylene, from 50 to 20 mole-percent of propylene and from 0.5 to 10% by mole of unconjugated diene, and the iodine number of the rubbery copolymer is from 4 to 50.

Typical examples of the unconjugated dienes used in the ethylene-propylene terpolymer include 1,4-hexadiene, dicyclopentadiene, 5-methylene - 2 - norbornene, 5-ethylidene-2-norbornene, 4,7,8,9-tetrahydroindene, etc.

Examples of the propylene polymer used in the invention include a crystalline polypropylene prepared by using a Ziegler-Natta type coordination catalyst and an atactic polypropylene with an intrinsic viscosity of from 0.05 to 3.0 dl./g. which is produced as a polymerization medium-soluble by-product in the preparation of the above crystalline polypropylene. Furthermore, copolymers containing predominantly propylene which is prepared by copolymerizing propylene with a small amount of olefins such as ethylene and butene-1 or of vinyl compound such as vinyl acetate and styrene may also be employed. Examples of the organic peroxide used in the invention include dicumyl peroxide, 2,5-dimethyl-2,5-di (tertiary butyl peroxy) hexane, 2,5-dimethyl-2,5-di (tertiary butyl peroxy) hexyne, di-tertiary butyl peroxide, tertiary butyl hydroperoxide, cyclohexane peroxide, tertiary butyl diperphthalate, 1,3-di-tertiary butyl peroxy diisopropylbenzene, etc.

The maleimide compound used in the invention is a mono-maleimide compound or a bis-maleimide compound represented by the general formula of (1) or (2) respectively.

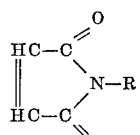

(1)

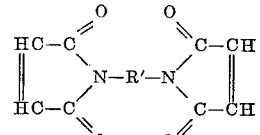

(2)

wherein each R and R' is monovalent and divalent aliphatic or aromatic radical, and these radicals may be substituted.

Among the maleimide compounds, a bis-maleimide compound is especially superior in effectiveness. Examples of the mono-maleimide compound are phenyl maleimide, 4-methylphenyl maleimide, 4-methoxyphenyl maleimide etc. Examples of the bis-maleimide are 4,4'-methylene-bis-phenyl bis-maleimide, m-phenylene bis-maleimide, 4 - methyl-m-phenylene-bis-maleimide, tolylene-bis-maleimide, 4,4'-ethylenediphenyl bis-maleimide, 4,4'-vinylenediphenyl bis-maleimide, p-phenylene bis-maleimide, 4,4'-sulfonyldiphenyl bis-maleimide, 2,2'-dithiodiphenyl bis-maleimide, 4,4' - ethylene-bis-oxyphenyl bis-maleimide, 3,3' - dichloro-4,4'-biphenyl bis-maleimide, o-phenylene bis-maleimide, hexamethylene bis-maleimide, 3,6-durine bis-maleimide, etc. The co-curable composition of the invention contains (A) 100 parts by weight of ethylene-propylene copolymer or ethylene-propylene terpolymer, (B) from 0.5 to 50 parts by weight of propylene polymer and (C) from 0.1 to 30 parts by weight, preferably from 0.5 to 20 parts by weight, of organic peroxide and from 0.1 to 30 parts by weight, preferably from 0.5 to 20 parts by weight, of maleimide compound based on 100 parts by weight of the mixture of (A) and (B).

The composition of the invention may be prepared by any desired blending method. The order of the blending of the components constituting the composition is optional. For example, first either ethylene-propylene copolymer or ethylene-propylene terpolymer is blended with propylene polymer and then the organic peroxide and maleimide compound as the cross-linking agent are blended with the obtained mixture either simultaneously or separately. Alternatively first both of the cross-linking agents are blended with either one of the polymer components, or each cross-linking agent is blended separately with the polymer components, and thereafter the resulting polymer component mixtures are blended. These blendings may be carried out by known methods, for example, by employing a roll mill, Banbury mixer, etc.

Such additives as antioxidants, fillers, pigments and process oils may be optionally added to the composition of the present invention. The composition of the invention is compounded and then cured by employment of heated press according to compression molding process or by employment of steam according to direct or indirect vulcanization method. The vulcanization is preferably carried out at a temperature in the range between 120 and 210° C.

The following examples are given only to illustrate the invention, and are not intended to limit the invention.

EXAMPLE 1

A mixture of 100 parts by weight of ethylene-propylene terpolymer (Royalene 301 manufactured by Uniroyal Incorporation), 20 parts by weight of polypropylene (Sumitomo Noblen S-501 manufactured by Sumitomo Chemical Company), 50 parts by weight of HAF Black, 5 parts by weight of zinc oxide and one part by weight of stearic acid were compounded on an 8" roll mill at 180° C. for 15 minutes. Then, 5 parts by weight of 1,3-di-tertiary butyl peroxy diisopropylbenzene and 3 parts by weight of N,N'-metaphenylene bismaleimide were added to the mixture, and the obtained mixture was compounded at 160° C. for 5 minutes. The compound was press-cured at 175° C. for 20 minutes. A test piece was made from thus cured product and mechanical properties, oil-resistant property and heat-resistant property thereof was measured.

The mechanical properties were measured by the method of JIS 6301.

The oil-resistance was determined by the swelling ratio obtained by the ratio of the weight of the test piece after the immersion into gasoline at room temperature for 24 hours to the weight before the immersion, as given by following the formula.

$$\text{Swelling ratio } (\%) = \frac{\text{The weight of the test piece after the immersion}}{\text{The weight of the test piece before the immersion}} \times 100$$

The heat-resistance was indicated by the remaining ratio of the tensile strength which is obtained by measuring the tensile strength of the test piece by chopper tensile testing machine made by Shimadzu Seisakusho after aging at 150° C. for 3 days with use of test-tube aging tester.

Control 1

Example 1 was repeated, except that N,N'-metaphenylene bismaleimide was not used.

Control 2

Example 1 was repeated, except that polypropylene was not used.

The experimental results of Example 1, Control 1 and Control 2 are indicated in Table 1.

TABLE 1

| | Example 1 | Control 1 | Control 2 |
|---|---|---|---|
| Tensile strength (kg./cm.²) | 190 | 160 | 200 |
| Elongation (percent) | 340 | 300 | 350 |
| Hardness | 82 | 79 | 71 |
| Oil-resistance (percent) | 120 | 155 | 200 |
| Heat-resistance (percent) | 85 | 75 | 90 |

EXAMPLE 2

To 100 parts by weight of ethylene-propylene terpolymer (Royalene 301 manufactured by Uniroyal, Inc.), 20 parts by weight of atactic polypropylene, which has 0.5 dl./g. of intrinsic viscosity measured in tetraline at 135° C., 50 parts by weight of HAF Black, 5 parts by weight of zinc oxide, one part by weight of stearic acid, 6.0 parts by weight of dicumyl peroxide and 3.0 parts by weight of N,N'-metaphenylene bismaleimide were added and thoroughly mixed on an 8" roll mill at 50° C.

The extrusion processability of the blend was measured by 30 mm. φ extruder under conditions of compression ratio of 1:1.5, L/D=9.33, die temperature of 120° C. and screw-rotation number of 40 r.p.m.

The extrusion amount was determined by the weight per unit of time which was obtained by extruding the blend with use of rod die with 6 mm. diameter and cutting the extrudate in a determined period and weighing the extrudate.

The die swell was represented by the following formula and was defined by a conversion ratio of a diameter of the extrudate after leaving it at room temperature for 5 hours.

$$\text{Die swell } (\%) = \frac{(\text{Diameter of the Extrudate}) - (\text{Diameter of rod die})}{\text{Diameter of rod die}} \times 100$$

Control 3

Example 2 was repeated, except that atactic polypropylene was not used.

The extrusion processabilities of the Example 2 and Control 3 are indicated in Table 2.

TABLE 2

| | Example 2 | Control 3 |
|---|---|---|
| Amount of extrusion (g./min.) | 350 | 220 |
| Die swell (percent) | 23 | 40 |

EXAMPLE 3

To 100 parts by weight of ethylene-propylene copolymer (Dutral N/C manufactured by Monte-Edison), 20 parts by weight of polypropylene (Sumitomo Noblen S-501 manufactured by Sumitomo Chemical Company), 50 parts by weight of HAF Black, 5 parts by weight of zinc oxide and one part by weight of stearic acid were added and compounded on an 8" roll mill at 180° C. for 15 minutes. Then, 5 parts by weight of 1,3-ditertiary-butyl peroxy diisopropylbenzene and 3.0 parts by weight of N,N'-metaphenylene bismaleimide were added thereto and the mixture was compounded at 160° C. for 5 minutes. The mixture was press-cured at 175° C. for 20 minutes.

Control 4

Example 3 was repeated, except that N,N'-metaphenylene bismaleimide was not used.

Control 5

Example 3 was repeated, except that polypropylene was not used.

The experimental results of Example 3, Controls 4 and 5 are indicated in Table 3.

TABLE 3

| | Example 3 | Control 4 | Control 5 |
|---|---|---|---|
| Tensile strength (kg./cm.²) | 165 | 150 | 170 |
| Elongation (percent) | 310 | 290 | 320 |
| Hardness | 75 | 73 | 66 |
| Oil-resistance (percent) | 110 | 145 | 190 |

What is claimed is:

1. A co-curable composition consisting essentially of a blend of 100 parts by weight of (A) a rubbery polymer selected from the group consisting of ethylene-propylene binary copolymer and ethylene-propylene-non-conjugated diene terpolymer from 0.5 to 50 parts of (B) a crystalline propylene polymer, containing predominately propylene, from 0.1 to 30 parts, based on 100 parts of (A) plus (B), of (C) a cross-linking agent selected from the group consisting of organic peroxides and organic hydroperoxides, and from 0.1 to 30 parts, based on 100 parts of (A) plus (B), of (D) a cross-linking agent selected from the group consisting of maleimide compounds and bis-maleimide compounds.

2. A composition as in claim 1 the said (A) being an ethylene-propylene-non-conjugated diene terpolymer and the said (B) being crystalline polypropylene.

3. A composition as in claim 1 containing, by weight, 100 parts of (A), from 0.5 to 50 parts of (B), from 0.5 to 20 parts of (C) based on 100 parts of (A) plus (B), and from 0.5 to 20 parts of (D) based on 100 parts of (A) plus (B).

4. A composition as in claim 1 in which (D) is selected from compounds of the formulas

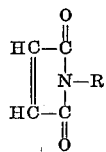

and

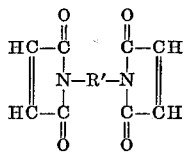

wherein R is a monovalent organic radical selected from the group consisting of aliphatic radicals, aromatic radicals, substituted aliphatic radicals and substituted aromatic radicals, and R' is a divalent organic radical selected from the group consisting of aliphatic radicals, aromatic radicals, substituted aliphatic radicals and substituted aromatic radicals.

5. A composition as in claim 2 in which (D) is as defined in claim 5.

6. A composition as in claim 3 in which (D) is as defined in claim 5.

7. A method of making a co-cured composition comprising heating to curing temperature the composition defined in claim 1.

8. A method of making a co-cured composition comprising heating to curing temperature the composition defined in claim 2.

9. A method of making a co-cured composition comprising heating to curing temperature the composition defined in claim 3.

10. A method of making a co-cured composition comprising heating to curing temperature the composition defined in claim 4.

11. A method of making a co-cured composition comprising heating to curing temperature the composition defined in claim 5.

12. A method of making a co-cured composition comprising heating to curing temperature the composition defined in claim 6.

13. A co-cured composition resulting from the method of claim 7.

14. A co-cured composition resulting from the method of claim 8.

15. A co-cured composition resulting from the method of claim 9.

16. A co-cured composition resulting from the method of claim 10.

17. A co-cured composition resulting from the method of claim 11.

18. A co-cured composition resulting from the method of claim 12.

References Cited

UNITED STATES PATENTS

| | | | |
|---|---|---|---|
| 3,456,038 | 7/1969 | Newman et al. | 260—878 |
| 3,402,140 | 9/1968 | Bickel et al. | 260—38 |
| 3,240,727 | 3/1966 | Scalari et al. | 260—2.5 |
| 2,958,672 | 11/1960 | Goldberg | 260—45.5 |

FOREIGN PATENTS

| | | | |
|---|---|---|---|
| 1,043,078 | 9/1966 | Great Britain | 260—897 |

MURRAY TILLMAN, Primary Examiner

C. J. SECCURO, Assistant Examiner

U.S. Cl. X.R.

260—23 H, 41 B, 41 R, 94.9 G, 897 B

UNITED STATES PATENT OFFICE
CERTIFICATE OF CORRECTION

Patent No. 3,641,215                  Dated February 8, 1972

Inventor(s) TERUYOSHI USAMOTO, et al.

It is certified that error appears in the above-identified patent and that said Letters Patent are hereby corrected as shown below:

Column 5, line 43, change "claim 5" to --claim 4--.

Column 5, line 45, change "claim 5" to --claim 4--.

Signed and sealed this 5th day of September 1972.

(SEAL)
Attest:

EDWARD M. FLETCHER, JR.            ROBERT GOTTSCHALK
Attesting Officer                    Commissioner of Patents